Feb. 14, 1928.　　　　　　　　　　　　　　　　　　1,659,085
E. L. CUNNINGHAM ET AL
METHOD AND APPARATUS FOR CHARGING FLUIDS AND OTHER SUBSTANCES WITH
ULTRAVIOLET RAYS
Filed Jan. 17, 1925
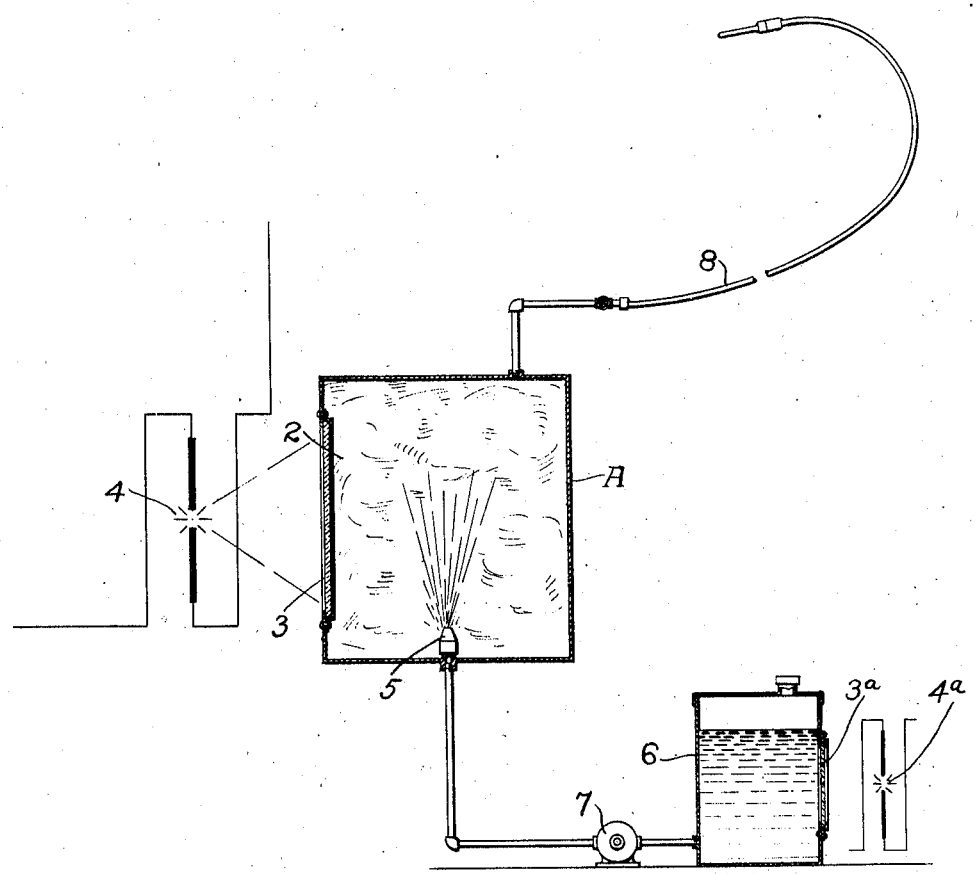

Patented Feb. 14, 1928.

1,659,085

UNITED STATES PATENT OFFICE.

EDWARD L. CUNNINGHAM AND HARRY F. MACBETH, OF SEATTLE, WASHINGTON.

METHOD AND APPARATUS FOR CHARGING FLUIDS AND OTHER SUBSTANCES WITH ULTRAVIOLET RAYS.

Application filed January 17, 1925. Serial No. 3,081.

This invention relates to a method and apparatus for charging fluids and other substances with ultraviolet rays.

The therapeutic action or effect obtained by exposing the human body to the action of ultraviolet rays is today a well known and established fact as, (1) It has been proven beyond a doubt that the rays are powerfully germicidal; (2) bacteria are killed in the tissues to a depth of 1 millimeter wherever the rays strike the body and are killed to the depth of 4 to 5 millimeters if the blood is forced out of the tissues by pressure; (3) metabolism is increased by exposure to ultraviolet rays; (4) the rays have a powerfully tonic effect on the blood, rapidly increasing the red cell count in anæmic conditions, and increasing the alkalinity of the blood; stimulating lymphocytosis; breaking down toxins; relieving pain and producing a sedative effect and sense of well-being in the patient with an increase of elimination and respiration.

It has recently been discovered that certain substances in the form of fluids and otherwise have the capacity of fluorescing or phosphorescing when exposed to ultravoilet rays, and also that certain substances have the capacity of fluorescing or phosphorescing after the source of radiation has been removed. It has also been discovered that the human body contains many physiological products which fluoresce. These fluorescent substances absorb ultraviolet rays and their chemical reactions are influenced by the energy that is absorbed. Fluorescence, by the way, is that property by which substances become self-luminous when exposed to light of certain wavelengths.

Many drugs, such as quinine sulphate, are fluorescent and the presence of such a drug in the tissues or in the blood-stream vastly increase the natural fluorescence of the human body. (Dr. E. C. Titus, New York city) J. Stark, prof. of physics, in the Universary of Berlin, claims that all substances possessing the ability to absorb certain wave-lengths of light, or possessing selective absorption, are fluorescent. Stark and Meyer also found that many substances fluoresce in the invisible ultraviolet region.

Some of the substances in solution which have this property are benzol ($C_6H_6$), catechol, resorcin, hydroquinone, etc.

It was found by Stark and Meyer that the fluorescent light emitted by any single substance was changed to entirely different wave-lengths when that substance was combined with another substance in solution. Also that the greatest fluorescence was shown by dilute solutions.

The combined action of ultraviolet light and a fluorescent drug on the human organism may be due to the intensity and penetration of the light being increased by the drug; or, the intensity of the pharmacological properties of the drug may be increased by the light.

Whatever the action may be, the power of the ultraviolet rays is markedly increased when a fluorescent drug, such as quinine sulphate, is used.

Cures are obtained in cases which are not affected at all by the rays alone. This is a comparatively recent development of the greatest importance. It is probably that this fluorescent transformation takes place within the body cells, or in the blood, or in both, and certain products are then discharged into the blood-stream to be carried to other parts of the body where needed, although these parts are not in the direct path of the ultraviolet rays. It is necessary to conclude, therefore, that light in some way raises the efficiency of the body cells and puts into operation reparatory mechanism which otherwise would have been inoperative or ineffective. (The above statements regarding the action of ultraviolet rays in conjunction with a fluorescent drug have been obtained by the collaboration of Drs. McCollom, Shipley and Simmonds, of Johns Hopkins University, Park and Powers of Yale University, and for further information see American Medical Association Journal, January, 1922.)

Practically all ultraviolet ray treatment as applied to the human body has so far been practically limited to external application and while such treatment is successful in the alleviation and cure of certain diseases, it is by no means a "cure-all".

The discovery of the fluorescent or phosphorescing substances, as previously stated, is a comparatively recent development and is proving of great importance as it increases the range of application of the ultraviolet ray.

The purpose of the present invention is to further increase the utility of the violet ray to the extent that it will render it available for treatment of pathological conditions of the air passages and other cavities and canals of the human body.

For the purpose of treating pulmonary cases, a drug or any other suitable substance may be employed which will fluoresce. This drug or substance may be dissolved in a suitable liquid and the liquid is vaporized or changed to a gaseous state. This gas or vapor is passed through a container and it is there exposed to the direct action of the ultraviolet rays. The gas or vapor thus becomes charged with the ultraviolet rays and as such may be inhaled into the lungs of the patient, where the resultant rays characteristic of the drug when fluorescing will be directly applied to the cells of the lung structure and to lesions, if any may exist. This is accomplished as follows, having reference to the accompanying drawing in which a diagrammatic view of the apparatus is illustrated.

In the drawing A indicates a container constructed of any suitable material. Formed in one side thereof is an opening or aperture 2, in which is mounted a quartz window 3. Disposed on the opposite side of the window is a lamp of any suitable construction, as indicated at 4, by which ultraviolet rays are emitted. Disposed in the bottom of the container is an atomizing nozzle 5. This is connected with a container 6 containing a liquid in which the fluorescent or phosphorescent drug or other substance has been dissolved. The liquid in the container 6 is forced through the nozzle 5 under pressure, which may be produced by delivering air under pressure on top of the liquid, or by employing a pump, as indicated at 7. The liquid discharging through the nozzle will be vaporized and as it is exposed to the direct action of the ultraviolet rays passing through the quartz window 3, it can readily be seen that the vapor will become charged with the ultraviolet rays. A tube 8 is connected with the upper end of the container and the charged vapors may thus be inhaled directly into the lungs by inserting the tube in the mouth or otherwise and the lung cells, tissues and lesions are thus directly exposed to the emanations of the fluorescing or phosphorescing substance.

The form of apparatus here illustrated will reduce the liquid or other substance employed to an atomized or vaporous form, but it is obvious that it may be reduced to a vapor or gaseous form by other means; for instance, by heat treatment or otherwise.

We therefore wish it understood that while the apparatus here disclosed is more or less specifically illustrated, changes may be made within the scope of the appended claims. It should also be understood that while this application merely describes one use of the vapors or gases which have been exposed and charged by the ultra violet rays, to-wit, that of treating pulmonary and like cases, it is obvious that such vapors or gases may be otherwise applied.

It is to be further understood that although the process here described consists of vaporizing the liquid and charging the vapors before inhalation the process may also be changed so that the liquid containing the fluorescent or phosphorescent material may first be irradiated and thus charged with the ultraviolet rays and subsequently vaporized or atomized by any suitable means as before indicated. Where the liquid is to be subjected to the action of the ultraviolet rays before vaporization, it is possible that a quartz window, such as indicated at 3ª, may be placed in the container 6 and in that instance an ultraviolet lamp, such as shown at 4ª, will be placed exteriorly thereof. Again, it is possible that it is desirable to first subject the liquid to the action of the ultraviolet rays and again to subject it to the ultraviolet rays while in a vapor or gaseous form.

In this connection we also wish to point out that certain elemental gases, such as hydrogen and nitrogen, also have the property of absorbing certain wave lengths of the ultra violet, and where such gases may be employed, it is obvious that they may be passed directly through the container A and subjected to the action of the rays.

Having thus described our invention, what we claim and desire to secure by Letters Patent is—

1. A method of absorbing ultraviolet rays, which consists in dissolving a fluorescent substance in a liquid, reducing said liquid to a vapor or gaseous form and subjecting said vapor or gas to the radiant action of ultraviolet rays.

2. A method of absorbing ultraviolet rays, which consists in dissolving a fluorescent or phosphorescent substance in a liquid, reducing said liquid to a vapor or gaseous form, and subjecting said vapor or gas to the radiant action of ultraviolet rays.

3. An apparatus for absorbing ultraviolet rays comprising a container having a quartz window mounted therein, a spray nozzle in the container, means for delivering a liquid under pressure to said spray nozzle so as to reduce the liquid to a vaporous form, said liquid containing a fluorescent or phosphorescent substance, means for projecting ultraviolet rays through the quartz window so as to expose the vapor to the radiant action of the ultraviolet rays, and means for discharging said vapor after exposure to the ultraviolet rays.

4. A method of absorbing ultraviolet rays, which consists in dissolving a fluorescent or phosphorescent substance in a liquid, subjecting said liquid to the radiant action of ultraviolet rays and reducing said liquid to a vapor or gaseous form for the purposes of using said charged vapors or gases for certain purposes herein described.

5. An apparatus for absorbing ultraviolet rays comprising a closed container, a quartz window mounted therein, means for introducing a liquid containing a fluorescent or phosphorescent substance into this closed container, means of projecting ultraviolet rays from a suitable generator or source thereof into the said liquid, and means of vaporizing or atomizing or reducing to a gaseous state this said irradiated and charged liquid.

6. An apparatus for absorbing ultraviolet rays comprising a closed container adapted to receive a liquid capable of absorbing ultraviolet rays, a quartz window formed in one side of the container, a generator for the production of ultraviolet rays cooperating therewith, and means for vaporizing or atomizing the liquid after it has been subjected to the action of the ultraviolet rays.

EDWARD L. CUNNINGHAM.
HARRY F. MACBETH.